(12) United States Patent
Tang

(10) Patent No.: US 9,958,740 B2
(45) Date of Patent: May 1, 2018

(54) BLUE PHASE LIQUID CRYSTAL DISPLAY PANEL

(71) Applicant: Wuhan China Star Optoelectronics Technology Co., Ltd., Wuhan, Hubei (CN)

(72) Inventor: Yuejun Tang, Hubei (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 0 days. days.

(21) Appl. No.: 14/778,237

(22) PCT Filed: Jul. 16, 2015

(86) PCT No.: PCT/CN2015/084180
§ 371 (c)(1),
(2) Date: Dec. 1, 2016

(87) PCT Pub. No.: WO2017/000325
PCT Pub. Date: Jan. 5, 2017

(65) Prior Publication Data
US 2017/0139287 A1    May 18, 2017

(30) Foreign Application Priority Data

Jun. 30, 2015  (CN) .......................... 2015 1 0380874

(51) Int. Cl.
*G02F 1/1343* (2006.01)
*G02F 1/1333* (2006.01)

(52) U.S. Cl.
CPC .. *G02F 1/134363* (2013.01); *G02F 1/133345* (2013.01); *G02F 2201/121* (2013.01); *G02F 2201/123* (2013.01)

(58) Field of Classification Search
CPC ......... G02F 1/134363; G02F 1/133345; G02F 2201/121; G02F 2201/123
See application file for complete search history.

(56) References Cited

U.S. PATENT DOCUMENTS

| 7,830,485 B2* | 11/2010 | You ..................... G02F 1/13718 349/141 |
| 2008/0129901 A1* | 6/2008 | You ..................... G02F 1/13718 349/33 |

(Continued)

FOREIGN PATENT DOCUMENTS

| CN | 1527113 | 9/2004 |
| CN | 102162955 | 8/2011 |

(Continued)

OTHER PUBLICATIONS

Translated First Action , Chineses Patent Application Publication CN104965357, Jun. 2017.*

(Continued)

*Primary Examiner* — Tracie Y Green
(74) *Attorney, Agent, or Firm* — Kim Winston LLP

(57) ABSTRACT

Disclosed is a blue phase liquid crystal display panel which includes an upper substrate and a lower substrate which are disposed opposite to each other, and blue phase liquid crystals provided between the upper substrate and the lower substrate. The upper substrate is provided with a first common electrode on a side facing the blue phase liquid crystals, and the lower substrate is provided with a second common electrode and a plurality of pixel electrodes on a side facing the blue phase liquid crystals. The pixel electrodes each extend towards the first common electrode, thus forming a horizontal electric field between the upper substrate and the lower substrate. According to the present disclosure, higher horizontal field intensity can be achieved so that the external drive voltage of the blue phase liquid crystals can be greatly decreased.

8 Claims, 2 Drawing Sheets

(56) References Cited

U.S. PATENT DOCUMENTS

| | | | | |
|---|---|---|---|---|
| 2010/0302492 A1* | 12/2010 | Kubota | ............. | G02F 1/134363 |
| | | | | 349/138 |
| 2011/0249229 A1 | 10/2011 | Kubota et al. | | |
| 2017/0153503 A1* | 6/2017 | Tang | ................. | G02F 1/133707 |
| 2017/0153518 A1* | 6/2017 | Tang | ................. | G02F 1/134363 |
| 2017/0160598 A1* | 6/2017 | Tang | ................. | G02F 1/134309 |
| 2017/0192260 A1* | 7/2017 | Tang | ...................... | G02F 1/137 |
| 2017/0192261 A1* | 7/2017 | Tang | ...................... | G02F 1/137 |
| 2017/0192282 A1* | 7/2017 | Tang | ................... | G02F 1/13439 |

FOREIGN PATENT DOCUMENTS

| | | |
|---|---|---|
| CN | 102640041 | 8/2012 |
| CN | 102749767 | 10/2012 |
| CN | 103728796 | 4/2014 |
| CN | 103792743 | 5/2014 |
| CN | 103959158 | 7/2014 |
| CN | 104714344 | 6/2015 |

OTHER PUBLICATIONS

International Search Report and Written Opinion for International Application No. PCT/CN2015/084180, dated Feb. 14, 2016.
Chinese Office Action and Search Report for Chinese Patent Application No. 201510380874.9 dated Jun. 7, 2017.

\* cited by examiner

BLUE PHASE LIQUID CRYSTAL DISPLAY PANEL

CROSS REFERENCE TO RELATED APPLICATIONS

The present application claims the priority of Chinese patent application CN201510380874.9, entitled "Blue phase liquid crystal display panel" and filed on Jun. 30, 2015, the entirety of which is incorporated herein by reference.

TECHNICAL FIELD

The present disclosure relates to the technical field of liquid crystal displays, and in particular, to a blue phase liquid crystal display panel.

TECHNICAL BACKGROUND

In the technical field of liquid crystal displays, blue phase liquid crystals have been widely used in liquid crystal display devices in virtue of their excellent properties. For instance, due to the optical isotropy of blue phase liquid crystals, the liquid crystal display devices using blue phase liquid crystals have advantages such as high response rate, wide viewing angle, excellent dark state, etc. Meanwhile, being different from other liquid crystal display devices, liquid crystal display devices using blue phase liquid crystals do not need an alignment layer, which simplifies the manufacturing process of liquid crystal display devices, and further reduces the manufacturing cost. In addition, when the thickness of the liquid crystal cell of the display device using blue phase crystals is larger than the penetration depth of the electric field, the effects of the change of thickness of the liquid crystal cell on transmissivity can be neglected. This feature enables blue phase liquid crystals particularly suitable for the manufacture of large screens or single board liquid crystal display devices.

However, blue phase liquid crystals suffer from the problem of requiring a high drive voltage. According to existing technologies, the drive voltage of blue phase liquid crystals is reduced usually through improving the performance of blue phase liquid crystal materials or optimizing the electrode structures. However, as for the method of improving the performance of blue phase liquid crystal materials, for example, preparing a blue phase liquid crystal material with a large Kerr constant, it involves a very complex process of synthesizing the blue phase liquid crystal material, and therefore the cost is very high. As for the method of optimizing the electrode structures, according to the drive method with IPS structure, the penetration depth of the lateral electric field generated by the parallel electrodes is limited. Therefore, a high drive voltage is still required.

In order to solve the problems existing in the above technologies, it is desired to obtain a blue phase liquid crystal display panel with an electrode structure that can increase the intensity of the lateral electric field, thereby reducing the drive voltage of the blue phase liquid crystal.

SUMMARY OF THE INVENTION

Directed against the above technical problems, the present disclosure provides a new type of blue phase liquid crystal display panel.

The blue phase liquid crystal display panel provided by the present disclosure comprises an upper substrate and a lower substrate which are disposed opposite to each other, and blue phase liquid crystals provided between the upper substrate and the lower substrate. The upper substrate is provided with a first common electrode on a side facing the blue phase liquid crystals, and the lower substrate is provided with a second common electrode and a plurality of pixel electrodes on a side facing the blue phase liquid crystals. The pixel electrodes each extend towards the first common electrode, forming a horizontal electric field between the upper substrate and the lower substrate.

According to the blue phase liquid crystal display panel provided by the present disclosure, the pixel electrode extends towards the first common electrode, enabling the pixel electrodes each to have an extending length extending towards the first common electrode. In this case, an electric field is generated between the pixel electrode and the first common electrode, and between the pixel electrode and the second common electrode. By configuring the extending length of the pixel electrode, the electric field generated between the pixel electrode and the first common electrode, and between the pixel electrode and the second common electrode can have a larger horizontal component in the liquid crystal layer, thereby rendering the intensity of electric field higher in the liquid crystal layer in the horizontal direction. The higher intensity of electric field enables the liquid crystal molecules in the blue phase liquid crystals to have a higher deformation rate in the horizontal direction, thereby reducing the external drive voltage of the blue phase liquid crystal. It should be noted that the pixel electrodes each can extend from the second common electrode to the first common electrode, or alternatively extend from the lower substrate to the first common electrode. In addition, the horizontal direction in the liquid crystal layer in the present disclosure refers to the direction parallel to the upper substrate and the lower substrate, and the horizontal electric field refers to the electric field along the horizontal direction, which can also be referred to as lateral electric field.

In some embodiments, the pixel electrodes each are provided with an insulating layer at an end facing the first common electrode. The insulating layer is used to enable the pixel electrode to approach the first common electrode on the upper substrate to the maximum, and in the meanwhile, to avoid the contact of the extending pixel electrodes with the first common electrode, thereby protecting the pixel electrode and avoiding any display problems caused by the pressure on the upper substrate.

In some embodiments, the first common electrode completely covers the upper substrate, the second common electrode completely covers the lower substrate, and the pixel electrodes extend from the second common electrode in an insulating manner. According to such arrangement, the first common electrode and the second common electrode completely cover the corresponding substrate, thereby simplifying the manufacturing process of the first common electrode and the second common electrode.

In some embodiments, a third common electrode is provided between two neighboring pixel electrodes, and the third common electrode extends from the second common electrode to the first common electrode. A horizontal electric field is formed between the third common electrode and each of the neighboring pixel electrodes, further increasing the intensity of the electric field in the liquid crystal layer in the horizontal direction. Preferably, the third common electrode and the second common electrode can be formed in a one-piece structure according to these embodiments.

In some embodiments, the third common electrode is provided with an insulating layer at an end facing the first common electrode. The insulating layer protects the third common electrode, so as to avoid any display problems caused by the pressure on the upper substrate.

In some embodiments, the first common electrode completely covers the upper substrate, the second common electrode comprises a plurality of second sub-common electrodes which are arranged at intervals on the lower substrate, and the pixel electrodes each are arranged in a region between two neighboring second sub-common electrodes on the lower substrate. By configuring the second common electrode as a plurality of second sub-common electrodes, a horizontal electric field is generated between each of the second sub-common electrodes and each of the neighboring pixel electrodes.

In some embodiments, the second common electrode completely covers the lower substrate, the first common electrode comprises a plurality of first sub-common electrodes which are arranged at intervals on the upper substrate, and the pixel electrodes each extend from the second common electrode to a region between two neighboring first sub-common electrodes in an insulating manner. In the present embodiments, a third common electrode can also be provided between two neighboring pixel electrodes, and the third common electrode and the second common electrode can be formed in a one-piece structure.

In some embodiments, the first common electrode comprises a plurality of first sub-common electrodes which are arranged at intervals on the upper substrate, the second common electrode comprises a plurality of second sub-common electrodes which are arranged at intervals on the lower substrate, and the pixel electrodes each are arranged in a region between two neighboring second sub-common electrodes on the lower substrate. In the present embodiments, a horizontal electric field is generated between each of the first sub-common electrodes and the corresponding pixel electrode, and between each of the second sub-common electrodes and the corresponding pixel electrode.

In some embodiments, the first sub-common electrode completely corresponds to the second sub-common electrode. In this case, the intensity of the electric field generated in the liquid crystal layer is distributed more equally.

In some embodiments, the extending length of the pixel electrode is larger than or equal to half of the distance between the upper substrate and the lower substrate, and is smaller than the distance between the upper substrate and the lower substrate. By configuring the extending length of the pixel electrode reasonably within the above distance range, the intensity of the electric field in the liquid crystal layer in the horizontal direction can be effectively improved.

Compared with the existing technologies, the present disclosure provides more electrode structures which render the intensity of electric field higher in the liquid crystal layer in the horizontal direction, thereby reducing the external drive voltage used for driving the blue phase liquid crystals. In addition, to provide an insulating layer at the extending end of the pixel electrodes ensures the safety of using the liquid crystal display device.

BRIEF DESCRIPTION OF THE DRAWINGS

For further illustrating the technical solutions provided in the embodiments of the present disclosure, a brief introduction will be given below to the accompanying drawings involved in the embodiments.

In the accompanying drawings, the same components use the same reference signs. The drawings are not drawn to scale.

DETAILED DESCRIPTION OF THE EMBODIMENTS

The present disclosure will be explained in detail with reference to the accompanying drawings.

The details provided herein are merely exemplary in nature, and serve only as examples in discussing the embodiments of the present disclosure, as well as the most useful and comprehensible description about the present disclosure with respect to the principle and concepts thereof. These descriptions are provided only for basic understanding of the present application. One skilled in the art can clearly understand, based on the description and the accompanying drawings, how to implement the present disclosure in different ways.

Figure 1:
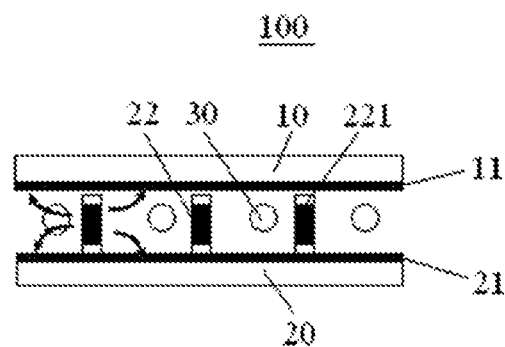
FIG. 1 schematically shows the structure of a blue phase liquid crystal display panel according to embodiment 1 of the present disclosure.

FIG. 1 schematically shows the structure of a blue phase liquid crystal display panel 100 according to embodiment 1 of the present disclosure. The blue phase liquid crystal display panel 100 comprises an upper substrate 10 and a lower substrate 20 which are disposed opposite to each other, and blue phase liquid crystals 30 provided between the upper substrate 10 and the lower substrate 20. The upper substrate 10 is provided with a first common electrode 11 on a side facing the blue phase liquid crystal, and the lower substrate 20 is provided with a second common electrode 21 and a plurality of pixel electrodes 22 on a side facing the blue phase liquid crystals. The pixel electrodes 22 each extend towards the first common electrode 11, thus forming a horizontal electric field between the upper substrate and the lower substrate as shown by the arrows in FIG. 1.

According to the blue phase liquid crystal display panel 100 provided by the present disclosure, the pixel electrodes 22 each extend towards the first common electrode 11, enabling the pixel electrodes 22 each to have an extending length extending towards the first common electrode 11. In this case, an electric field is generated between each of the pixel electrodes 22 and the first common electrode 11, and between each of the pixel electrodes 22 and the second common electrode 21. By configuring the extending length of the pixel electrodes 22, the electric field generated between the pixel electrodes 22 and the first common electrode 11, and between the pixel electrodes 22 and the second common electrode 21 each can have a larger horizontal component in the liquid crystal layer, thereby rendering the intensity of the electric field higher in the liquid crystal layer in the horizontal direction. The higher intensity of the electric field enables the liquid crystal molecules in the blue phase liquid crystals to have a higher optical anisotropy in the horizontal direction, thereby reducing the external drive voltage of the blue phase liquid crystals. It should be noted that the pixel electrodes 22 can extend from the second common electrode 21 to the first common electrode 11, or alternatively extend from the lower substrate 20 to the first common electrode 11. In addition, the horizontal direction in the liquid crystal layer in the present disclosure refers to the direction parallel to the upper substrate 10 and the lower substrate 20, and the horizontal electric field refers to the electric field along the horizontal direction, which can also be referred to as lateral electric field.

In an embodiment as shown in FIG. 1, the pixel electrodes each 22 are provided with an insulating layer 221 at an end facing the first common electrode 11. The insulating layer 221 is used to enable the pixel electrode 22 to approach the first common electrode 11 on the upper substrate 10 to the maximum, and in the meanwhile, to avoid the contact of the extending pixel electrode 22 with the first common electrode 11, thereby protecting the pixel electrode 22 and avoiding any display problems caused by the pressure on the upper substrate 10.

Preferably, as shown in FIG. 1, the first common electrode 11 completely covers the upper substrate 10, the second common electrode 21 completely covers the lower substrate 20, and the pixel electrodes 22 each extend from the second common electrode 21 in an insulating manner. According to such arrangement, the first common electrode 11 and the second common electrode 21 completely cover the corresponding substrate thereof, thereby simplifying the manufacturing process of the first common electrode 11 and the second common electrode 21.

Figure 2:
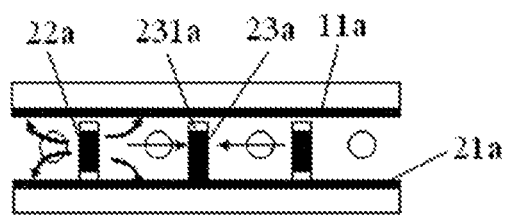
FIG. 2 schematically shows the structure of the blue phase liquid crystal display panel according to embodiment 2 of the present disclosure.

In an embodiment as shown in FIG. 2, different from embodiment 1, a third common electrode 23a is provided between two neighboring pixel electrodes 22a, and the third common electrode 23a extends from the second common electrode 21a to the first common electrode 11 a. A horizontal electric field is formed between the third common electrode 23a and each of the neighboring pixel electrodes 22a, further increasing the intensity of the electric field in the liquid crystal layer in the horizontal direction. Preferably, the third common electrode 23a and the second common electrode 21a can be formed in a one-piece structure according to this embodiment.

Preferably, the third common electrode 23a is provided with an insulating layer 231a at an end facing the first common electrode 11 a. The insulating layer 231a protects the third common electrode 23a, so as to avoid any display problems caused by the pressure on the upper substrate.

Figure 3:
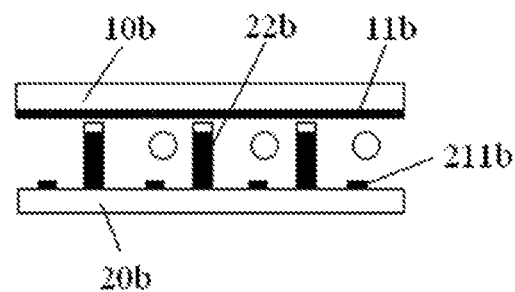
FIG. 3 schematically shows the structure of the blue phase liquid crystal display panel according to embodiment 3 of the present disclosure.
Figure 4:
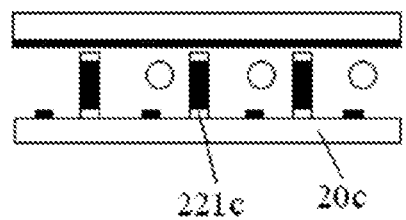
FIG. 4 schematically shows the structure of the blue phase liquid crystal display panel according to embodiment 4 of the present disclosure.

In an embodiment as shown in FIG. 3, the first common electrode 11b completely covers the upper substrate 10b, the second common electrode comprises a plurality of second sub-common electrodes 211b which are arranged at intervals on the lower substrate 20b, and the pixel electrodes 22b each are arranged in a region between two neighboring second sub-common electrodes 211b on the lower substrate 20b. By configuring the second common electrode as a plurality of second sub-common electrodes 211b, a horizontal electric field is generated between each of the second sub-common electrodes 211b and each of the neighboring pixel electrodes 22b. Besides, the pixel electrodes 22b can be provided directly on the lower substrate 20b as shown in FIG. 3, or can also be provided on the lower substrate 20c via an insulating layer 211c as shown in FIG. 4.

Figure 5:
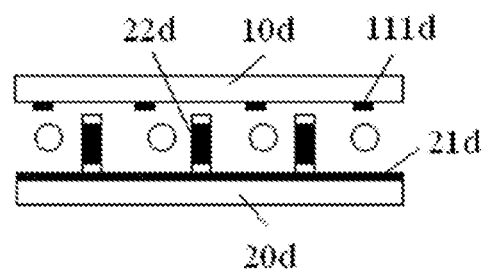
FIG. 5 schematically shows the structure of the blue phase liquid crystal display panel according to embodiment 5 of the present disclosure.
Figure 6:
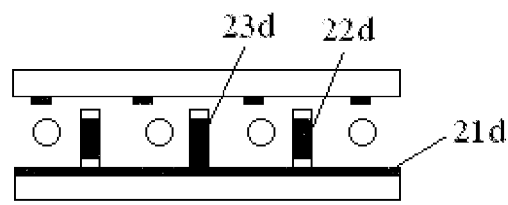
FIG. 6 schematically shows the structure of the blue phase liquid crystal display panel according to embodiment 6 of the present disclosure.

In an embodiment as shown in FIG. 5, the second common electrode 21d completely covers the lower substrate 20d, the first common electrode comprises a plurality of first sub-common electrodes 111d which are arranged at intervals on the upper substrate 10d, and the pixel electrodes 22d each extend from the second common electrode 21d to a region between two neighboring first sub-common electrodes 111d in an insulating manner. Preferably, as shown in FIG. 6, a third common electrode 23d can also be provided between two neighboring pixel electrodes 22d, and the third common electrode 23d and the second common electrode 21d can be formed in a one-piece structure.

Figure 7:
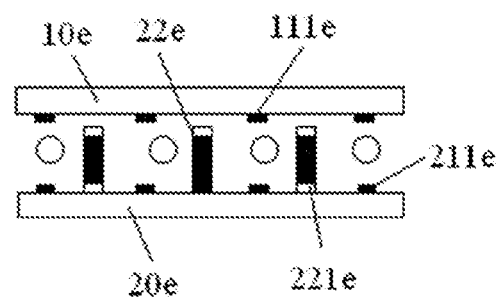
FIG. 7 schematically shows the structure of the blue phase liquid crystal display panel according to embodiment 7 of the present disclosure.

In an embodiment as shown in FIG. 7, the first common electrode comprises a plurality of first sub-common electrodes 111e which are arranged at intervals on the upper substrate 10e, the second common electrode comprises a plurality of second sub-common electrodes 211e which are arranged at intervals on the lower substrate 20e, and the pixel electrodes 22e each are arranged in a region between two neighboring second sub-common electrodes 211e on the lower substrate 20e. In the present embodiment, a horizontal electric field is generated between each of the first sub-common electrodes 111e and the corresponding pixel electrode 22e, and between each of the second sub-common electrodes 211e and the corresponding pixel electrode 22e. Preferably, the first sub-common electrode 111e completely corresponds to the second sub-common electrode 211e. In this case, the intensity of the electric field generated in the liquid crystal layer is distributed more equally.

According to the present disclosure, taking the embodiment as shown in FIG. 1 as an example, the extending length of the pixel electrode 22 is larger than or equal to half of the distance between the upper substrate 10 and the lower substrate 20, and is smaller than the distance between the upper substrate 10 and the lower substrate 20. By configuring the extending length of the pixel electrode 22 reasonably within the above distance range, the intensity of the electric field in the liquid crystal layer in the horizontal direction can be effectively improved. For example, the length of the pixel electrode 22 can be preferably ⅔ or ¾ of the distance between the upper substrate 10 and the lower substrate 20.

It should be noted that in the present disclosure, the upper substrate 10 further comprises a color resistance layer, a black matrix layer, etc., and the lower substrate 20 further comprises a semi-conductor layer, a flattening layer, etc. These structures are common designs in the art, and are not shown in the Figures. In the meanwhile, the common electrodes and pixels electrodes in the present disclosure can be provided in relative layers based on practical situations, which will not be described herein in detail.

The above embodiments are described only for better understanding, rather than restricting the present disclosure. Anyone skilled in the art can make amendments to the implementing forms or details without departing from the spirit and scope of the present disclosure. The scope of present disclosure should still be subject to the scope defined in the claims.

The invention claimed is:

1. A blue phase liquid crystal display panel, comprising:
   an upper substrate and a lower substrate which are disposed opposite to each other, and
   blue phase liquid crystals provided between the upper substrate and the lower substrate,
   wherein the upper substrate is provided with a first common electrode on a side facing the blue phase liquid crystals, and the lower substrate is provided with a second common electrode and a plurality of pixel electrodes on a side facing the blue phase liquid crystals, wherein the pixel electrodes each extend towards the first common electrode, forming a horizontal electric field between the upper substrate and the lower substrate, wherein the pixel electrodes each are provided with an insulating layer at an end facing the first common electrode, and wherein the extending length of the pixel electrode is larger than or equal to half of the distance between the upper substrate and the lower substrate, and is smaller than the distance between the upper substrate and the lower substrate.

2. The blue phase liquid crystal display panel according to claim 1, wherein the first common electrode completely covers the upper substrate, and the second common electrode completely covers the lower substrate, the pixel electrodes each extending from the second common electrode in an insulating manner.

3. The blue phase liquid crystal display panel according to claim 2, wherein a third common electrode is provided between two neighboring pixel electrodes, the third common electrode extending from the second common electrode to the first common electrode.

4. The blue phase liquid crystal display panel according to claim 3, wherein the third common electrode is provided with an insulating layer at an end facing the first common electrode.

5. The blue phase liquid crystal display panel according to claim 1, wherein the first common electrode completely covers the upper substrate, and the second common electrode comprises a plurality of second sub-common electrodes which are arranged at intervals on the lower substrate, the pixel electrodes each being arranged in a region between two neighboring second sub-common electrodes on the lower substrate.

6. The blue phase liquid crystal display panel according to claim 1, wherein the second common electrode completely covers the lower substrate, and the first common electrode comprises a plurality of first sub-common electrodes which are arranged at intervals on the upper substrate, the pixel electrodes each extending from the second common electrode to a region between two neighboring first sub-common electrodes in an insulating manner.

7. The blue phase liquid crystal display panel according to claim 1, wherein the first common electrode comprises a plurality of first sub-common electrodes which are arranged at intervals on the upper substrate, and the second common electrode comprises a plurality of second sub-common electrodes which are arranged at intervals on the lower substrate, the pixel electrodes each being arranged in a region between two neighboring second sub-common electrodes on the lower substrate.

8. The blue phase liquid crystal display panel according to claim 7, wherein the first sub-common electrode completely corresponds to the second sub-common electrode.

\* \* \* \* \*